United States Patent
Atungsiri et al.

(10) Patent No.: US 11,303,494 B2
(45) Date of Patent: Apr. 12, 2022

(54) WIRELESS COMMUNICATIONS DEVICE, INFRASTRUCTURE EQUIPMENT AND METHODS

(71) Applicant: Sony Corporation, Tokyo (JP)

(72) Inventors: Samuel Asangbeng Atungsiri, Basingstoke (GB); Shin Horng Wong, Basingstoke (GB); Martin Warwick Beale, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 51 days.

(21) Appl. No.: 16/620,871

(22) PCT Filed: May 24, 2018

(86) PCT No.: PCT/EP2018/063683
§ 371 (c)(1),
(2) Date: Dec. 9, 2019

(87) PCT Pub. No.: WO2018/228789
PCT Pub. Date: Dec. 20, 2018

(65) Prior Publication Data
US 2020/0204423 A1    Jun. 25, 2020

(30) Foreign Application Priority Data
Jun. 16, 2017   (EP) .................................. 17176479

(51) Int. Cl.
*H04L 27/26* (2006.01)
*H04L 7/06* (2006.01)
(Continued)

(52) U.S. Cl.
CPC ....... *H04L 27/2655* (2013.01); *H04B 7/0695* (2013.01); *H04L 5/0007* (2013.01);
(Continued)

(58) Field of Classification Search
CPC . H04W 36/0094; H04W 48/10; H04W 48/16; H04W 24/10; H04W 48/12;
(Continued)

(56) References Cited

U.S. PATENT DOCUMENTS

2016/0308637 A1* 10/2016 Frenne ............. H04W 56/0015
2018/0324022 A1* 11/2018 Sheng .................. H04L 5/0048
(Continued)

FOREIGN PATENT DOCUMENTS

| CN | 105723639 A | 6/2016 |
|---|---|---|
| CN | 106576319 A | 4/2017 |

(Continued)

OTHER PUBLICATIONS

R1-1708720, SS Block Composition and SS Burst Set Composition, 3GPP TSG-RAN WG1 Meeting #89, Ericsson, May 15-19, 2017 (Year: 2017).*
(Continued)

*Primary Examiner* — Aristocratis Fotakis
(74) *Attorney, Agent, or Firm* — Xsensus LLP

(57) ABSTRACT

Mixture of implicit and explicit signaling of the Synchronization Signal Block (SSB) time index for 5G New Radio. In NR, multiple SSBs (each containing PSS, SSS and PBCH) are sent on different beams, and on multiple time occurrences. The UE when detecting the SSB has therefore to identify the SSB time instance and the beam ID used by the gNB. This detection is allowed by said SSB time index. If sent on the PBCH, this prevents soft combining between PBCH time instances. It is therefore proposed to send the SSB time index via the DMRS interleaved with the PBCH. Problem: overhead would be too high for DMRS solution only. Solution: Part of the bits (the LSBs) of the SSB time index are signaled implicitly via the relative position of PSS, (Continued)

(a)    (b)    (c)    (d)

SSS and PBCH within a SSB. The other bits are explicitly sent using DMRS scrambling.

8 Claims, 7 Drawing Sheets

(51) Int. Cl.
| | |
|---|---|
| *H04B 5/00* | (2006.01) |
| *H04W 56/00* | (2009.01) |
| *H04B 7/06* | (2006.01) |
| *H04L 5/00* | (2006.01) |

(52) U.S. Cl.
CPC .......... *H04L 5/0023* (2013.01); *H04L 5/0048* (2013.01); *H04L 5/0053* (2013.01); *H04L 27/2613* (2013.01); *H04W 56/001* (2013.01)

(58) Field of Classification Search
CPC .... H04W 56/00; H04L 5/0048; H04L 5/0094; H04L 27/2655; H04B 17/318; H04B 17/0094
See application file for complete search history.

(56) References Cited

U.S. PATENT DOCUMENTS

| | | | | |
|---|---|---|---|---|
| 2018/0367985 | A1* | 12/2018 | Novlan | H04W 8/22 |
| 2019/0230696 | A1* | 7/2019 | Kim | H04L 5/0053 |
| 2019/0387488 | A1* | 12/2019 | Wang | H04L 5/0051 |
| 2020/0076568 | A1* | 3/2020 | Nguyen | H04L 1/1845 |
| 2020/0119965 | A1* | 4/2020 | Harada | H04W 72/04 |
| 2020/0128498 | A1* | 4/2020 | Harada | H04L 27/2649 |

FOREIGN PATENT DOCUMENTS

| | | | | |
|---|---|---|---|---|
| WO | 2016/075475 | A1 | | 5/2016 |
| WO | WO-2016075475 | A1 * | 5/2016 | ............. H04B 7/066 |
| WO | 2018/202883 | A1 | | 11/2018 |

OTHER PUBLICATIONS

International Search Report and Written Opinion dated Aug. 31, 2018 for PCT/EP2018/063683 filed on May 24, 2018, 12 pages.
Boutros, J., and Viterbo, E., "Signal Space Diversity: A Power—and Bandwidth-Efficient Diversity Technique For The Rayleigh Fading Channel," IEEE Transactions on Information Theory, vol. 44, No. 4, Jul. 1998, pp. 1453-1467.
Donarski, A., et al., "Downlink LTE Synchronization: A Software Defined Radio Approach," 2014 8th International Conference on Signal Processing and Communication Systems (ICSPCS), Dec. 15-17, 2014, 9 pages.
Fujitsu, "Consideration on SS block time index indication," 3GPP TSG RAN WG1 Meeting No. 89, R1-1707252, Hangzhou, P.R. China, May 15-19, 2017, 4 pages.
Fujitsu, "NR-PBCH design," 3GPP TSG RAN WG1 Meeting No. 89, R1-1707253, Hangzhou, China, Apr. 15-19, 2017, 10 pages.
Holma, H., and Toskala, A., "LTE for UMTS—OFDMA and SC-FDMA Based Radio Access," System Architecture Based on 3GPP SAE, Wiley, 2009, ISBN 978-0-470-99401-6, 10 pages.
NTT DoCoMo, Inc., "New WID on New Radio Access Technology," 3GPP TSG RAN Meeting No. 75, RP-170847, Dubrovnik, Croatia, Mar. 6-9, 2017, 8 pages.
Qualcomm Incorporated, "New Work Item: NarrowBand IOT (NB-IOT)," 3GPP TSG RAN Meeting No. 69, RP-151621, Phoenix, USA, Sep. 14-16, 2015, 9 pages.
Huawei et al.: "Discussion on SS block time index indication", 3GPP Draft; R1-1708166, 3rd Generation Partnership Project (3GPP), Mobile Competence Centre ; 650, Route Des Lucioles ; F-06921 Sophia-Antipolis Cedex ; Francevol. RAN WG1, No. Hangzhou, China; May 15, 2017-May 19, 2017 May 14, 2017 (May 14, 2017), XP051273362, Retrieved from the Internet: URL:http://www.3gpp.org/ftp/Meetings_3GPP_SYNC/RAN1/Docs/ [retrieved on May 14, 2017].

\* cited by examiner

WIRELESS COMMUNICATIONS DEVICE, INFRASTRUCTURE EQUIPMENT AND METHODS

CROSS-REFERENCE TO RELATED APPLICATIONS

This application is based on PCT filing PCT/EP2018/063683, filed on 24 May 2018, which claims the benefit of priority from EP Application number 17176479.8, filed on 16 Jun. 2017 the entire contents of each are incorporated herein by reference.

BACKGROUND

Field of Disclosure

The present disclosure relates to wireless communications devices which are configured to transmit data to or receive data from a wireless communications network via a wireless access interface and which are configured to detect information broadcast or unicast to the wireless communications devices to facilitate the reception of data. The present technique also relates to infrastructure equipment forming part of a wireless communications network and transmitters and receivers.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the Third Generation Project Partnership (3GPP) defined Universal Mobile Telecommunications Standard (UMTS) and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio access technology (which may be denoted new RAT or, simply, NR) networks, to support efficiently connectivity for a wide range of devices associated with different applications with different characteristic data traffic profiles, resulting in different devices having different operating characteristics and/or requirements. The introduction of new radio access technology (RAT) systems/networks therefore gives rise to new opportunities as well as challenges.

SUMMARY OF THE DISCLOSURE

According to the present technique, there is provided a wireless communications device for transmitting or receiving data via a wireless communications network. The wireless communications device comprises transmitter circuitry configured to transmit radio signals via a wireless access interface to an infrastructure equipment forming a radio network part of the wireless communications network, receiver circuitry configured to receive radio signals transmitted from the infrastructure equipment via the wireless access interface, and controller circuitry configured to control the transmitter circuitry and the receiver circuitry to transmit data carried by the radio signals to the infrastructure equipment and to receive data carried by the radio signals from the infrastructure equipment. The controller circuitry is configured with the receiver circuitry to detect a plurality of synchronisation signal blocks transmitted by the infrastructure equipment via the wireless access interface, each synchronisation signal block comprising one or more first Orthogonal Frequency Division Multiplexed, OFDM, symbols carrying a primary synchronisation signal, one or more second OFDM symbols carrying a secondary synchronisation signal and one or more third OFDM symbols carrying information of a physical broadcast channel of the wireless access interface, each of the OFDM symbols of the synchronisation block being formed by a plurality of frequency domain sub-carrier signals each being transmitted over the duration of the OFDM symbol as a resource element of the wireless access interface, each OFDM symbol of the synchronisation signal block having the same sub-carrier spacing, and each of the third OFDM symbols being arranged to include demodulation reference symbols, each synchronisation signal block being transmitted through one beam of a plurality of beams, each beam being formed using a plurality of antennas, and an antenna weight vector used to form each beam is the same for the first OFDM symbols, the second OFDM symbols and the third OFDM symbols, to decode each of the detected synchronisation signal blocks to recover a synchronisation signal block time index representing a cardinal number of the detected synchronisation signal block, each cardinal number being associated with a beam of the plurality of beams used to transmit the detected synchronisation signal block, and to determine, based on the recovered synchronisation signal block time index, which of the beams was used to transmit the each of the detected synchronisation signal blocks.

Embodiments of the present technique further relate to infrastructure equipment, methods of operating communications devices, and methods of operating infrastructure equipment. Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

LTE Technology (4G)

Figure 1:
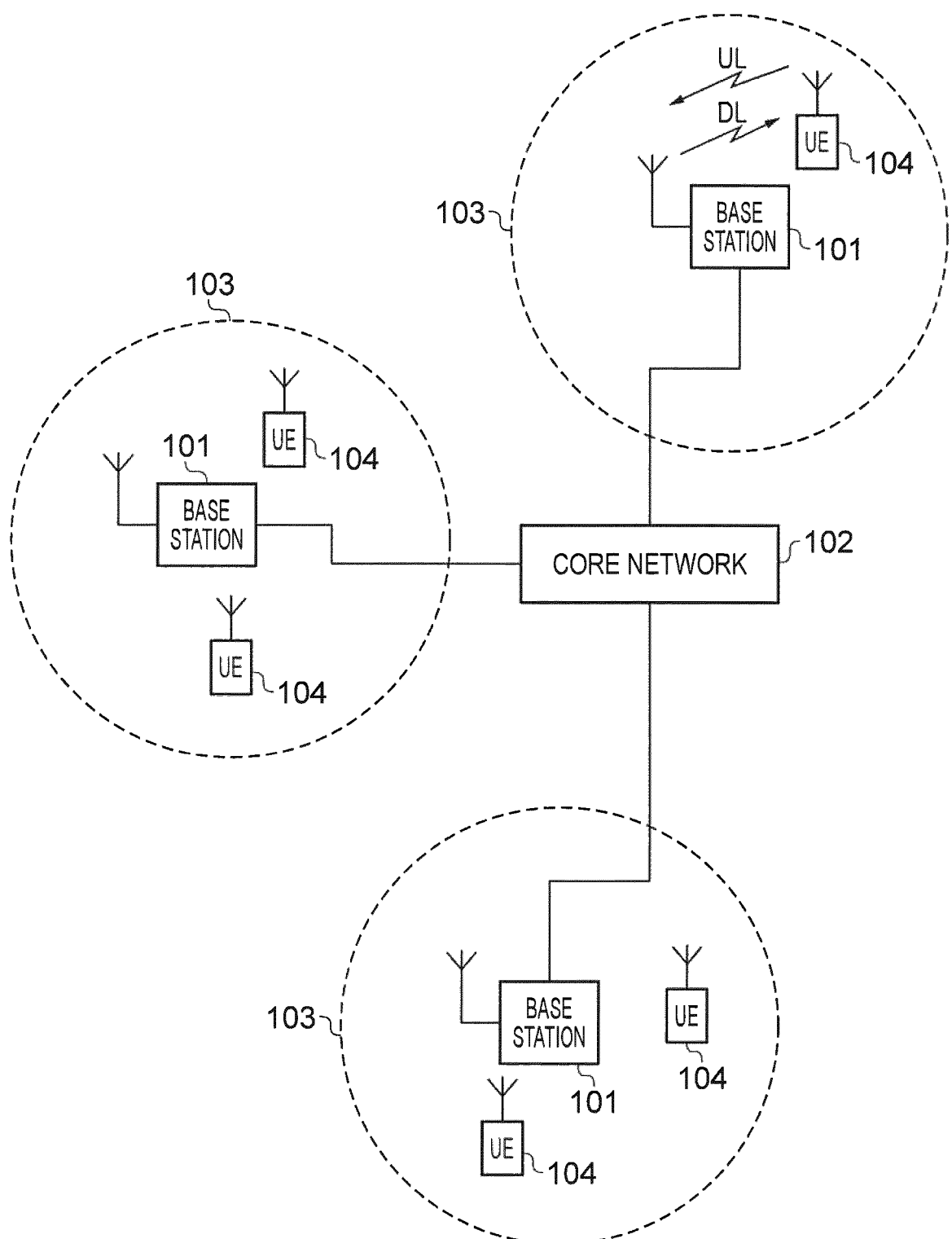
FIG. 1 is a schematic block diagram illustrating in example current configuration of a wireless communications network in accordance with a conventional LTE standard.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1].

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

New Radio Access Technology (5G)

As mentioned above, the embodiments of the present invention can find application with advanced wireless communications systems such as those referred to as 5G or New Radio (NR) Access Technology. New Radio Access Technology (RAT) has been proposed in [2] to develop a new RAT for the next generation wireless communication system, i.e. 5G, and in 3GPP a new Work Item (WI) on NR has been agreed [3] in order to study and develop the new RAT. The new RAT is expected to operate in a large range of frequencies, from hundreds of MHz to 100 GHz and it is expected to cover a broad range of use cases. The use cases that are considered under this SI include:

Enhanced Mobile Broadband (eMBB)
Massive Machine Type Communications (mMTC)
Ultra Reliable & Low Latency Communications (URLLC)

Figure 2:
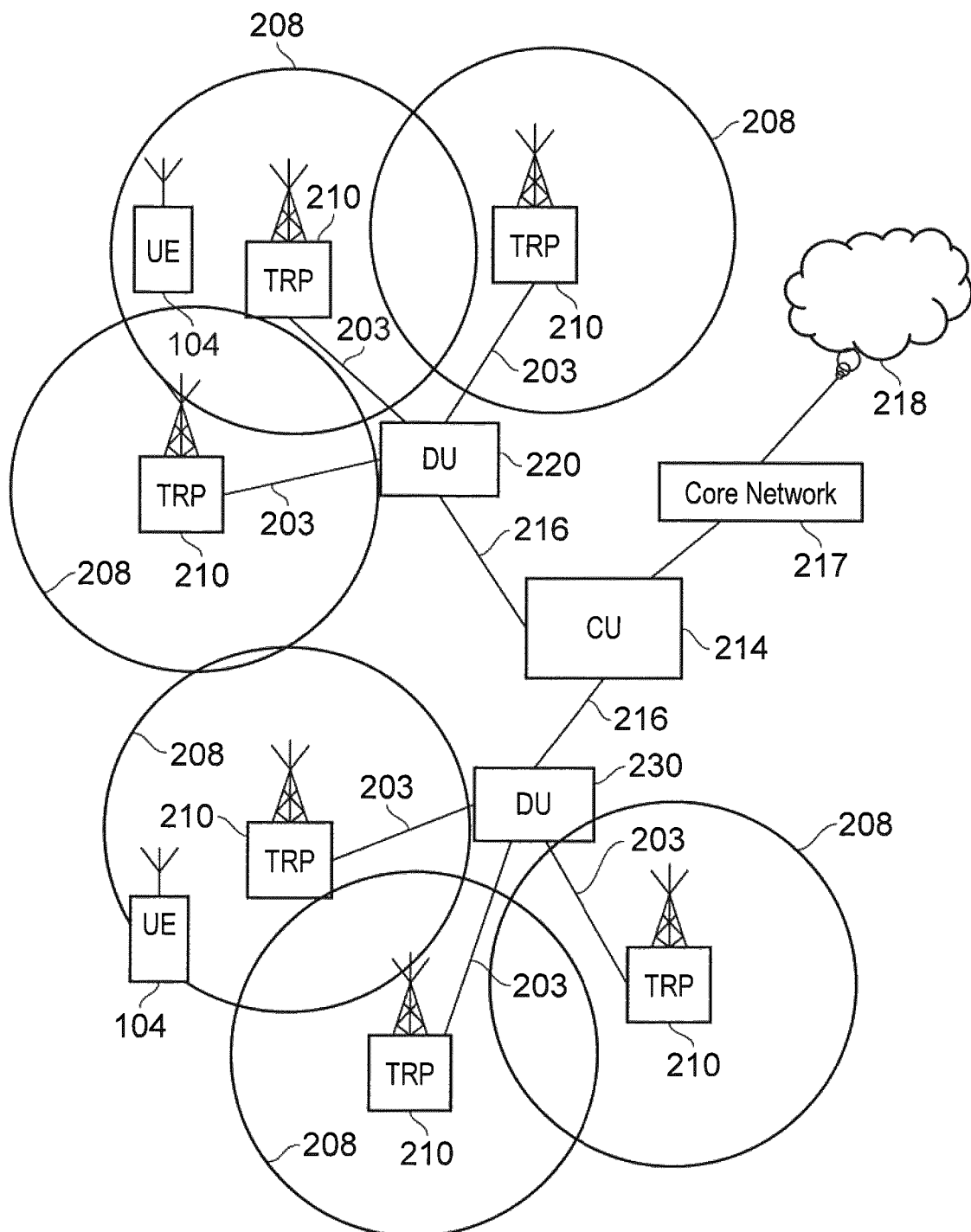
FIG. 2 is a schematic block diagram of an example of a wireless communications network configured in accordance with an example of an enhanced new radio (NR) or 5G network.

The aim of 5G is not only mobile connectivity for people, but to provide ubiquitous connectivity for any type of device and any type of application that would benefit from being connected. Many requirements and use-cases are still being discussed, but amongst those are:

Low latency
High data rates
Millimetre wave spectrum use
High density of network nodes (e.g. small cell and relay nodes)
Large system capacity
Large numbers of devices (e.g. MTC devices/Internet of Things devices)
High reliability (e.g. for vehicle safety applications, such as self-driving cars)
Low device cost and energy consumption
Flexible spectrum usage
Flexible mobility An example configuration of a wireless communications network which uses some of the terminology proposed for NR and 5G is shown in FIG. 2. In FIG. 2 a plurality of transmission and reception points (TRP) 210 are connected to distributed control units (DU) 220, 230 by a connection interface represented as a line 203. Each of the transmitter receiver points (TRP) 210 is arranged to transmit and receive signals via a wireless access interface within a radio frequency bandwidth available to the wireless communications network. Thus within a range for performing radio communications via the wireless access interface, each of the TRP 210, forms a cell of the wireless communications network as represented by a dashed line 208. As such wireless communications devices 104 which are within a radio communications range provided by the cells 210 can transmit and receive signals to and from the TRP 210 via the wireless access interface. Each of the distributed control units 220, 230 are connected to a coordinating unit (CU) 214 via an interface 216. The CU 214 is then connected to the a core network 217 which may contain all other functions required for communicating data to and from the wireless communications devices and the core network 217 may be connected to other networks 218.

The elements of the wireless access network shown in FIG. 2 may operate in a similar way to corresponding elements of an LTE network such as that shown in FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 210 of FIG. 2 may in part have a corresponding functionality to a base station or eNodeB 101 of an LTE network, and so the terms TRP, eNodeB and gNodeB in the following description are interchangeable. Base stations, which are an example of radio network infrastructure equipment, may also be referred to as transceiver stations /NodeBs/eNodeBs (eNBs)/gNodeBs (gNBs), and so forth. Similarly the communications devices 104 may have a functionality corresponding to devices know for operation with an LTE network and may also be referred to as mobile stations, user equipment (UE), user terminal, terminal device, mobile radio, communications device, and so forth. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

As will be appreciated both the UEs and the base station/TRP/eNodeB/gNodeB may be implemented using radio frequency filters and circuits as well as signal processing hard and controlling logic implemented as ASICs or programmable controllers. Such controllers may be, for example, a microprocessor, a CPU, or a dedicated chipset, etc.

Figure 3A:
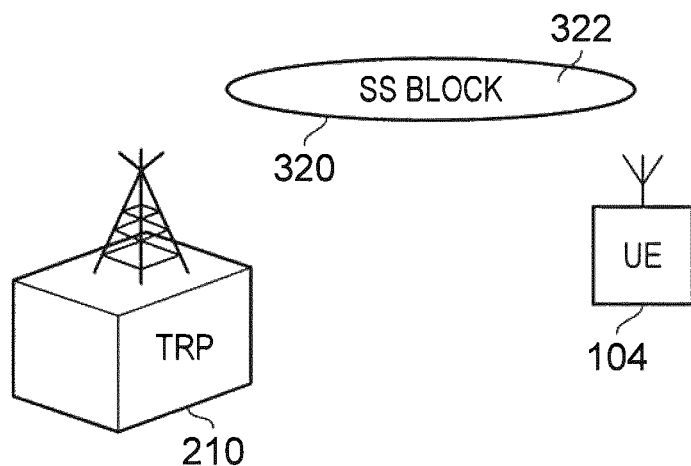
FIG. 3a is a schematic representation illustrating an arrangement in which a communications device initially detects a synchronisation block transmitted by a base station, gNodeB or TRP.

As shown in FIG. 3a when a UE 104 attempts to gain initial access to the wireless communications network it must detect information broadcast by one of the base stations (TRPs or gNodeBs) 210. According to one example, the gNodeB 210 includes a plurality of antennas which form an antenna array and using known techniques the signal transmitted from the gNodeB can be formed into a beam 320. The beam 320 transmits a synchronisation signal block 322 for detection by the UE 104. According to one example the synchronisation signal block 322 includes primary and secondary synchronisation signals as well as broadcast system information carried in a physical broadcast channel (PBCH).

Figure 3B:
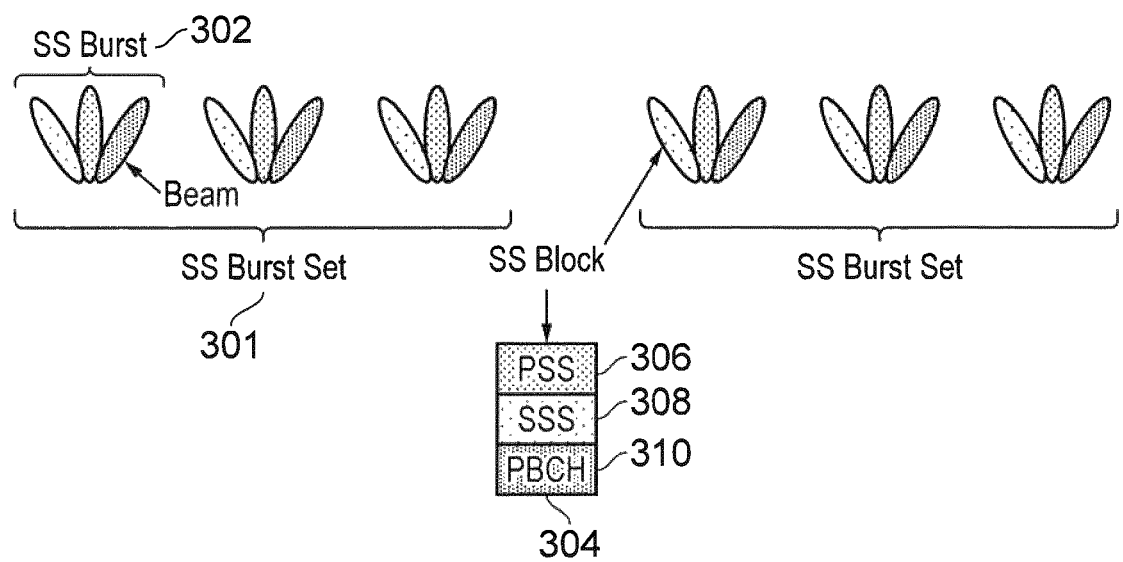
FIG. 3b is an illustrative representation showing the transmission of a synchronisation block comprising a primary and secondary synchronisation signals and a physical broadcast channel as proposed for NR.

For any waking UE accessing the NR network, it is expected that it would detect the primary and secondary synchronisation signals (PSS and SSS) to gain time, frequency and frame synchronisation as well as sector, group and cell identity information. The use of multiple antennas both at the UE and gNodeB further allows the use of beam forming to improve the spectral efficiency or traffic density which can be supported by the wireless communications system. The requirement for UEs to be able to synchronise to each of these beams separately means that the gNodeB can transmit separate synchronisation signals and one or more PBCH OFDM symbols for each beam that it forms. This separation of the synchronisation signals (SSS and PSS) can lead in some examples to the concept of a synchronisation signal block or burst comprised of the PSS, SSS and PBCH (where a synchronisation signal block is typically applied to a single beam). A synchronisation signal burst is comprised of multiple synchronisation signal blocks, where each synchronisation signal block within the synchronisation signal burst can be applied to a different beam. A synchronisation signal burst set is then comprised of multiple synchronisation signal bursts. Synchronisation signal blocks for a particular beam can be combined by the UE between synchronisation signal bursts within the synchronisation signal burst set. From a given gNodeB, the synchronisation signal burst set is repeated at regular intervals for use by new UEs entering the network and for enabling the UEs to perform down-link cell measurements and other procedures. An example is shown in FIG. 3b, where there are three synchronisation signal blocks 304 (each comprised of the PSS 306, SSS 308 and PBCH 310) in a synchronisation signal burst 302 as shown, i.e. three different beams for each synchronisation signal burst. In this example the synchronisation signal burst set 301 has three synchronisation signal bursts 302 and the synchronisation signal burst set 301 is repeated. It should be appreciated that other numbers of synchronisation signal blocks 304 per synchronisation signal burst 302 can be used and the number of synchronisation signal bursts 302 per synchronisation signal burst set 304 can be different, FIG. 3b being just one example.

Following acquisition of the PSS and the SSS, the UE can then find and decode the physical broadcast channel (PBCH) which in turn provides the UE with critical system and configuration information of the particular component carrier and/or beam. This critical system and configuration information is sometimes referred to as a "Master Information Block", MIB. Once the UE has decoded MIB, it may then decode other system information that is carried in System Information Blocks (SIBs).

The detection of the PSS and SSS entails the processing of signals to detect the particular sequences used in their construction, without need for channel estimation and equalisation. The decoding of the PBCH on the other hand requires channel estimation and equalisation prior to demodulation and error decoding (for example, performing decoding of a forward error correction code, such as a polar code or a tail biting convolutional code) of critical system information bits carried by the PBCH. Channel estimation requires the transmission of reference symbols that can be used to estimate the channel transfer function. Since reference symbols do not carry any information, it can be argued that their use reduces spectral efficiency. It is therefore desirable to reduce the number or density of reference symbols so as to minimise the loss in spectral efficiency arising from their inclusion.

Demodulation Reference Symbols for NR-PBCH

Co-pending European patent applicant number EP17169834.3 [4], which is applicable to embodiments of the present technique, provides an arrangement in which a wireless communications device operating within a wireless communications network can more efficiently detect information from a control channel such as a physical broadcast channel which is transmitted as one or more OFDM symbols preceded by a synchronisation OFDM symbol which is initially detected by a communications device or UE when the UE initially attempts to access the wireless communications network. Embodiments co-pending European patent applicant number EP17169834.3 can provide an arrangement in which the demodulation reference symbols (DMRS) which are used to estimate a channel transfer function or channel impulse response are transmitted in the PBCH OFDM symbols, wherein the PBCH OFDM symbols either do not have demodulation reference symbols in sub carrier signals in a frequency range which overlaps those of the synchronisation OFDM symbol or has a different pattern of reference symbols in this overlapping region compared to a region which does not overlap the frequencies of the synchronisation OFDM symbol.

Accordingly, since each of the PBCH OFDM symbols or the control carrying OFDM symbols must be equalised and error detection performed in order to recover the information carried by the PBCH OFDM symbols, a more reliable channel estimate can be determined by combining the part or parts of the channel estimate formed from the synchronisation OFDM symbol and the part or parts formed from the demodulation reference symbols carried by the PBCH OFDM symbols. In some examples therefore the estimation of the channel in the overlapping region is different to that in the non-overlapping region of the PBCH OFDM symbols.

In LTE-A (LTE-Advanced), the PSS is composed of one of three sequences. Detecting any one of these sequences at the UE indicates that the component carrier is transmitted from one of three possible sectors of the eNodeB. The SSS on the other hand carries two 31 element sequences which can be arranged in one of 168 possible ways. Between them, the PSS and SSS can therefore signal 504 different cell identities ranging from 0 to 3*167+2=503. Once the UE decides what sequence P(n) is carried in the given synchronisation symbol, the channel transfer function (CTF) $H_i(n)$ in each case can be determined by dividing the sequence of REs $R_i(n)$ with the transmitted reference sequence.

$$H_i(n) = \frac{R_i(n)}{P(n)}$$

Figure 4:
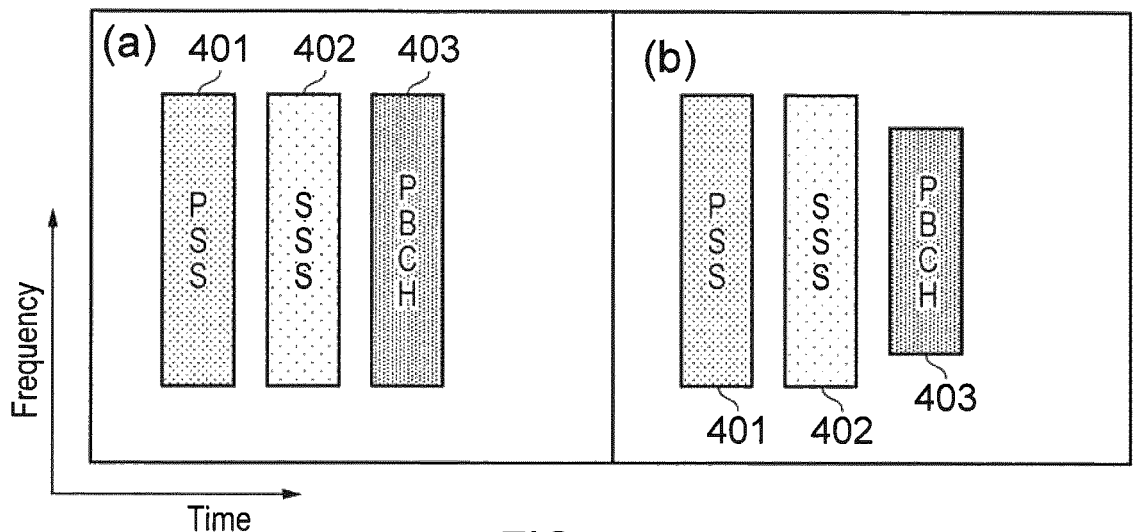
FIGS. 4a and 4b are schematic representations of a primary synchronisation signal, a secondary synchronisation signal and a physical broadcast channel carrying system information signalling forming part of a synchronisation signal block shown in FIGS. 3a and 3b.

When the relative speed of the receiver is low enough such that the Doppler frequency is less than $$\frac{1}{2KT_s}$$

where $T_S$ is the duration of one OFDM symbol, then the channel transfer function $H_i(n)$ determined from symbol i can be used for equalising symbol (i±m) where 0≤m≤K. Therefore the SSS can be used to estimate the channel transfer function used for demodulating the PBCH OFDM symbols so long as the PBCH OFDM symbols are within ±K symbols of the SSS. To use the synchronisation signal as reference symbols for channel estimation in decoding the PBCH OFDM symbols, the following must hold:

- The PBCH and synchronisation signal OFDM symbols are in the same frequency band
- The PBCH and synchronisation signal OFDM symbols use the same sub carrier spacing (SCS)
- The PBCH and synchronisation signal OFDM symbols coincide in frequency with the PBCH using the same REs as shown in FIG. 4a or fewer REs as shown in FIG. 4b (described below) as the synchronisation signal i.e. the PBCH has the same or lower bandwidth than the synchronisation signal.
- The PBCH and synchronisation signal uses the same precoding vector, which would be the case if they share the same beam FIGS. 4a and 4b provide representative examples of the PSS and SSS and a PBCH OFDM symbol as three OFDM symbols 401, 402, 403 within dimensions of both frequency and time. The dimensions in frequency correspond to a number of subcarriers transmitted as resource elements of the wireless access interface provided by the wireless communications network. However, each OFDM symbol is transmitted successively in time one after the other with the PSS and SSS 401, 402 transmitted first followed by the PBCH symbol 403. FIG. 4b provides a further example in which a bandwidth of the PBCH 403 is smaller than that of the PBCH shown in FIG. 4a. Note that the synchronisation signals that are used by the UE as reference symbols may depend on the characteristics of the synchronisation signal and how a network is deployed. For example, the PSS from neighbouring cells may carry the same synchronisation sequence and so if the PSS were used for channel estimation, a UE seeing more than one PSS from different cells will likely discern a multipath channel akin to one from a single frequency network (SFN). The composite channel of the SFN may not be indicative of the channel on the PBCH as the PBCH broadcast from different cells carries different information. In such a case, the UE may only use the SSS (which can be deployed with a greater reuse pattern—the SSS is sufficiently different between neighbouring cells), since these signals are more indicative of the channel on the PBCH.

On the other hand, the PBCH OFDM symbols can dedicate some REs for carrying demodulation reference symbols (DMRS). The optimum density of such DMRS is determined by the expected delay spread of the channel. Since the cyclic prefix $T_g$ adopted for the network is already designed to just exceed the maximum expected delay spread, the DMRS can have a density or frequency spacing of $1/T_g$Hz.

When $T_g$ is long, the high density (small spacing in frequency) of DMRS has an impact on the spectral efficiency of the PBCH.

Note that the wider the PBCH bandwidth (the higher the number of resource elements used for PBCH), the more minimum system information it can carry or conversely, the more robustly it can carry the minimum system information. Alternatively a wider bandwidth PBCH can carry the same amount of minimum system information in a smaller number of OFDM symbols, allowing the duration of a synchronisation signal block to be shorter, hence allowing more synchronisation signal blocks (and more beams) to be supported in a given time period. Therefore it is highly unlikely that the bandwidth of the PBCH would be less than that of the synchronisation signal as in FIG. 4(b). Further, given a certain amount of minimum system information, the use of DMRS means that the PBCH is more likely than not to occupy a wider bandwidth than the synchronisation signal, so that the PBCH may have more than double the bandwidth of the PSS and SSS as illustrated in FIG. 5.

Figure 5:
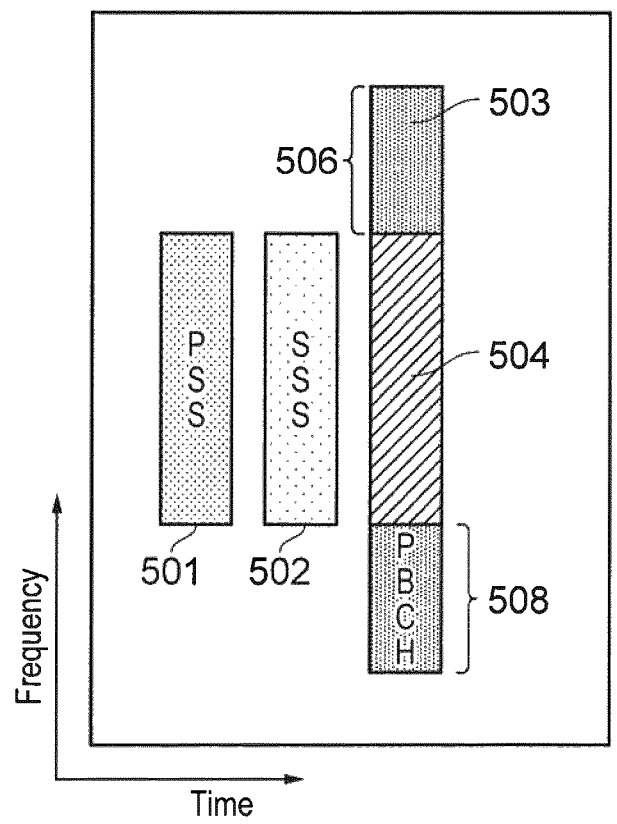
FIG. 5 is a schematic representation of a synchronisation block comprising OFDM symbols transmitting a primary synchronisation signal, a secondary synchronisation signal and a physical broadcast channel signal in which the physical broadcast channel signal has a wider bandwidth than the primary and secondary synchronisation signals.

FIG. 5 provides schematic representation of a synchronisation signal block in accordance with the present technique. As shown in FIG. 5 a representation of a PSS and SSS 501, 502 are shown in the form in which they correspond to those in FIGS. 4a and 4b. However, the OFDM symbol carrying the PBCH information 503 has an increased bandwidth with respect to those of the synchronisation signals 501, 502. As shown in FIG. 5 since a bandwidth of the PBCH carrying OFDM symbol is greater than that of the synchronisation signals 502, 501, a region exists which is referred to as an overlapping region 504 in which the sub carrier signals of the PBCH OFDM symbol have the same or overlapping frequencies to the OFDM symbols of the PSS 501 and SSS 502. Correspondingly there are also two regions 506, 508 where the sub carriers transmitted in these frequencies do not overlap or are not common to the sub carrier signals transmitted in the PSS and SSS OFDM symbols 501, 502.

In order to identify the beam in which a given synchronisation signal block is transmitted, the synchronisation signal block must convey a parameter known as the synchronisation signal block time index. In its simplest form, this is the cardinal number of the synchronisation signal block within a synchronisation signal burst that comprises multiple synchronisation signal blocks. This block time index can be carried either explicitly as one of the parameters carried within the PBCH payload or implicitly in the sense that the UE has to process the incoming signal in order to detect the block time index.

Embodiments of the present technique address issues including the sequencing of the different symbols that make up a synchronisation signal block in order to maximise the use of SSS as reference symbols for the demodulation of PBCH symbols, the efficient modulation of the DMRS with a pseudo-random sequence representative of the block timing index, robust processing of the DMRS required to detect the block time index and modulation of the PBCH payload in a robust manner to improve its immunity to frequency selective fading.

Synchronisation Signal Block Composition

Figure 6:
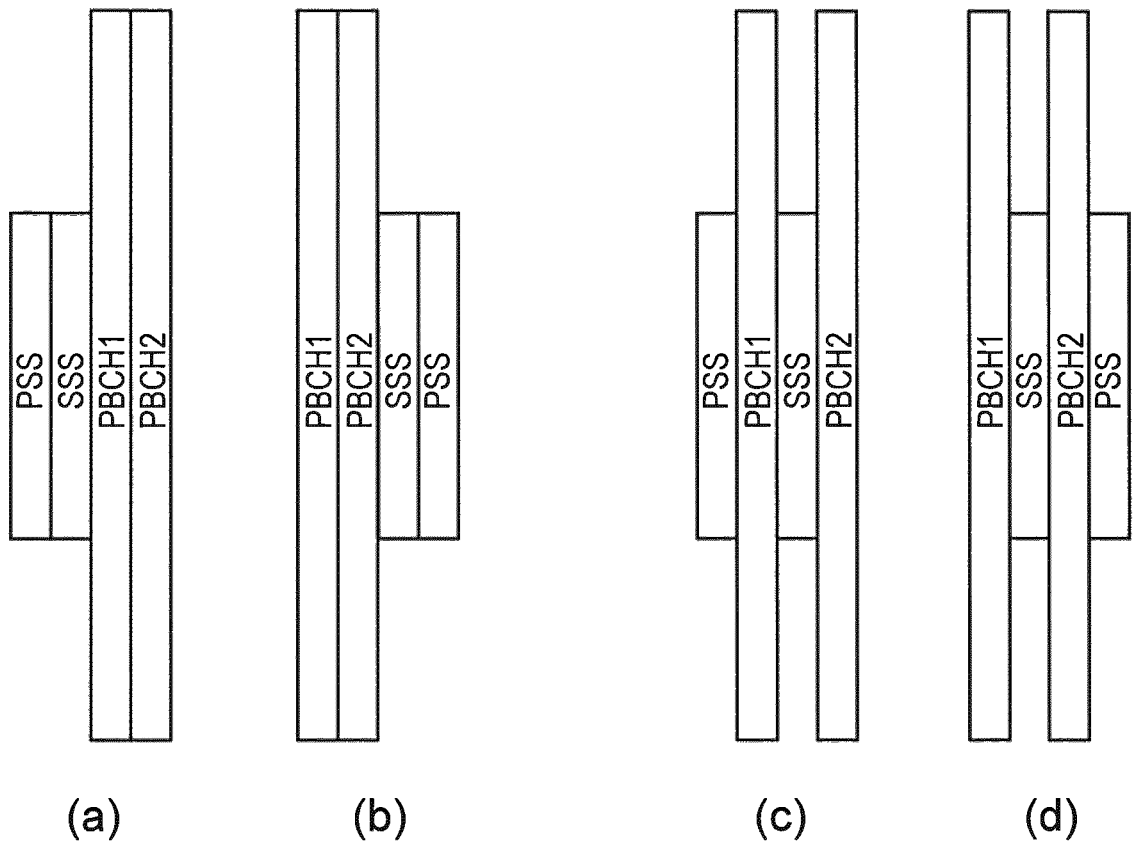
FIG. 6 illustrates examples of synchronisation signal block compositions.

The composition of a synchronisation signal block relates to the ordering of the different symbols that make up a synchronisation signal block. FIG. 6 illustrates some examples of synchronisation signal block compositions.

A feature of the composition in FIG. 6(a) compared to FIG. 6(b) is that the order of occurrence of the PSS and SSS is swapped. Thus in FIG. 6(a), the PSS occurs before the SSS whilst in FIG. 6(b), the SSS occurs before the PSS. The composition of FIG. 6(b) can therefore be thought of as a mirror form of the composition of FIG. 6(a). The situation is similar for FIG. 6(c) and FIG. 6(d).

It is envisaged that in some applications of embodiments of the present technique, one form of composition will be chosen between those of FIG. 6(a) and FIG. 6(c). In that case, embodiments of the present technique are also concerned with adopting in addition the mirror form of the chosen composition—respectively FIG. 6(b) or FIG. 6(d) in order to simplify the signalling of the block timing index. It should be borne in mind that other block compositions (and their mirror forms) are also possible. Other examples include:

PBCH-PSS-SSS-PBCH, mirror: PBCH-SSS-PSS-PBCH
PSS-PBCH-PBCH-SSS, mirror: SSS-PBCH-PBCH-PSS Indeed, it is possible for a given composition to have more than one defined mirror form. In some other applications of embodiments of the present technique compositions may be used which are not mirror forms of each other; but are simply different. In such embodiments, it may be defined that the PSS always occurs before the SSS, but their position in relation to the PBCH is different. For example, further possible composition pairs could include:

PBCH-PSS-SSS-PBCH and PSS-PBCH-PBCH-SSS
PSS-PBCH-SSS-PBCH and PBCH-PSS-PBCH-SSS

In some other applications of embodiments of the present technique, it should be appreciated that more than one composition could be used, which may or may not include compositions of mirrored form.

Synchronisation Signal Block Time Index Transmission

The synchronisation signal block time index is needed amongst other things to identify one of multiple beams from a given gNodeB. When a beam needs identifying for example for measurement purposes, it is desirable that this be done accurately, quickly and with as little processing as possible.

If the synchronisation signal block time index is included in the payload of the PBCH, this entails some disadvantages:

With N possible beams per gNodeB, the synchronisation signal block time index will increase the pay load of the PBCH by $\log_2(N)$ bits. Given the limited transmission resources available for transmitting the PBCH this increase in payload would entail a commensurate increase in the FEC code rate making the PBCH less robust to transmission impairments. In some embodiments N can be as much as 64 beams per gNodeB.

At the receiver, the PBCH symbols will need to be equalised, demodulated and FEC decoded to access the block time index whenever it is needed. All of this complex processing takes time.

For maximum accuracy of decoding for the PBCH at the receiver, it is desirable to exploit soft combining of successive PBCH payloads either within the burst or within the burst set. In LTE for example, the PBCH soft combining can be done over the equivalent of 4 bursts. This combining may be quite complicated if the block time index which is different between synchronisation signal blocks is carried within the PBCH payload.

On the other hand, if the synchronisation signal block time index is carried implicitly for example—modulated on the PBCH DMRS, detecting the block time index would be significantly faster as decoding of the PBCH is not required. However, while in this operating mode soft combining can be done for the PBCH within bursts, the PBCH DMRS on different synchronisation signal blocks are modulated differently, and so detection of the DMRS-carried block time index cannot benefit from combining across synchronisation signal blocks. This may lead to some degradation in the detection of the block time index. Some aspects of embodiments of the present technique mitigate this problem.

Conveying the Synchronisation Signal Block Time Index Via NR-PBCH DMRS

Embodiments of the present technique provide a wireless communications device for transmitting or receiving data via a wireless communications network. The wireless communications device comprises transmitter circuitry configured to transmit radio signals via a wireless access interface to an infrastructure equipment forming a radio network part of the wireless communications network, receiver circuitry configured to receive radio signals transmitted from the infrastructure equipment via the wireless access interface, and controller circuitry configured to control the transmitter circuitry and the receiver circuitry to transmit data carried by the radio signals to the infrastructure equipment and to receive data carried by the radio signals from the infrastructure equipment. The controller circuitry is configured with the receiver circuitry to detect a plurality of synchronisation signal blocks transmitted by the infrastructure equipment via the wireless access interface, each synchronisation signal block comprising one or more first Orthogonal Frequency Division Multiplexed, OFDM, symbols carrying a primary synchronisation signal, one or more second OFDM symbols carrying a secondary synchronisation signal and one or more third OFDM symbols carrying information of a physical broadcast channel of the wireless access interface, each of the OFDM symbols of the synchronisation block being formed by a plurality of frequency domain sub-carrier signals each being transmitted over the duration of the OFDM symbol as a resource element of the wireless access interface, each OFDM symbol of the synchronisation signal block having the same sub-carrier spacing, and each of the third OFDM symbols being arranged to include demodulation reference symbols, each synchronisation signal block being transmitted through one beam of a plurality of beams each beam formed using a plurality of antennas, and an antenna weight vector used to form each beam is the same for the first OFDM symbols, the second OFDM symbols and the third OFDM, to decode each of the detected synchronisation signal blocks to recover a synchronisation signal block time index representing a cardinal number of the detected synchronisation signal block, each cardinal number being associated with a beam of the plurality of beams used to transmit the detected synchronisation signal blocks, and to determine, based on the recovered synchronisation signal block time index, which of the beams was used to transmit the each of the detected synchronisation signal blocks.

In one aspect of embodiments of the present technique, the payload of the PBCH is modulated using signal space diversity (SSD) [5] as described in co-pending patent application published under number WO 2016/075475 A1 [6]. The component interleavers ensure the mapping of each modulated QAM symbol to two separate resource elements thereby providing frequency diversity to mitigate the impact of frequency selective fading. In other words, the infrastructure equipment is configured to modulate payload data carried by the physical broadcast channel using signal space diversity, and the wireless communications device is configured to demodulate payload data carried by the physical broadcast channel, the payload data having been modulated using signal space diversity by the infrastructure equipment.

In another aspect of embodiments of the present technique, the synchronisation signal block time index which represents the cardinal number of the synchronisation signal block in a synchronisation signal burst is used as a look up address into a table of complex pseudo-random sequences. In another aspect of embodiments of the present technique, all block time index sequences are based on the same generator polynomial whose feedback shift register can be initialized in each case with a bit sequence derived from the block index to be transmitted. The elements of the block time index sequence are used to modulate the DMRS of the PBCH symbols of the particular synchronisation signal block. The length of each block time index sequence L is the same as the number of resources available for DMRS on all the PBCH symbols in the particular synchronisation signal block. Therefore, if there are N possible synchronisation signal blocks per synchronisation signal burst, it is expected that each burst time index will represent $\log_2(N)$ bits and there to be N possible complex block time index sequences each of L elements. In some embodiments each gNodeB could accommodate as many as N=64 beams and therefore needing as many as 64 block time index sequences each. The number of PBCH DMRS has to be minimised in order to maximize the PBCH payload. Therefore, in one aspect of embodiments of the present technique, the number of possible block time index sequences can be reduced by M by adopting N mod M synchronisation block compositions. In the particular case where M=2, only half the number of possible block time index sequences is needed. Embodiments of the present technique are explained using M=2 but it should be understood that M can also be greater than 2.

Thus in the case when two compositions are adopted—for example FIGS. 6(a) and (c), the composition of FIG. 6(a) would be used for odd numbered synchronisation signal blocks and that of FIG. 6(c) used for even-numbered synchronisation signal blocks. The receiver is expected after detecting the PSS to detect the particular composition of each block—for example, the relative order of the PSS and SSS in order to determine whether it is detecting a given composition or its mirror or the immediate presence of SSS after PSS in the case of FIGS. 6(a) and (c). This detection gives the least significant bit (LSB) of the block time index. Blind detection of the block time index sequences on the DMRS can then involve only N/2 (or in the general case, N/M) sequences. This means that block time index sequence $S_n$ is used to modulate the PBCH DMRS of synchronisation signal blocks 2n and 2n+1 where n=0, 1, 2, N−1.

This approach has multiple advantages:
The block index of adjacent synchronisation signal blocks is more 'distant'—separated at least by the synchronisation signal composition in the case of blocks 2n and 2n+1, but additionally by different DMRS modulation sequences in blocks 2n+1 and 2n+2.
Prior to detecting the current synchronisation signal block index sequence modulated on the PBCH DMRS, knowledge of whether the current synchronisation signal burst is even numbered (2n) allows the DMRS from the current (2n) and following synchronisation signal burst (2n+1) to be combined since they both carry the same block index sequence. This DMRS combining will improve the detection performance of the block time index.
If the PBCH payload is the same for synchronisation signal bursts occurring within a frame, then this allows combining of PBCH soft values such as log-likelihood ratios prior to FEC decoding. Using embodiments of the present technique, it is also now possible to do OFDM symbol combining between the current (2n) and following synchronisation signal burst (2n+1) since the DMRS and data resource elements between the two symbols are the same.

It should be appreciated that apart from using the synchronisation signal block compositions to indicate odd or even numbered synchronisation signal blocks, other means of using compositions to coarsely indicate the synchronisation signal block time index can be used. For example, the most significant bit (MSB) can be represented by the compositions in FIG. 6(a) and FIG. 6(c), i.e. synchronisation signal block time indices from 0 to N/2−1 can be indicated using FIG. 6(a) and synchronisation signal block time indices N/2 to N−1 can be indicated using FIG. 6(c). Hence, the DRMS sequence would only need to indicate 1 of N/2 possible synchronisation signal block time indices.

Example Transmitter and Receiver

Figure 7:
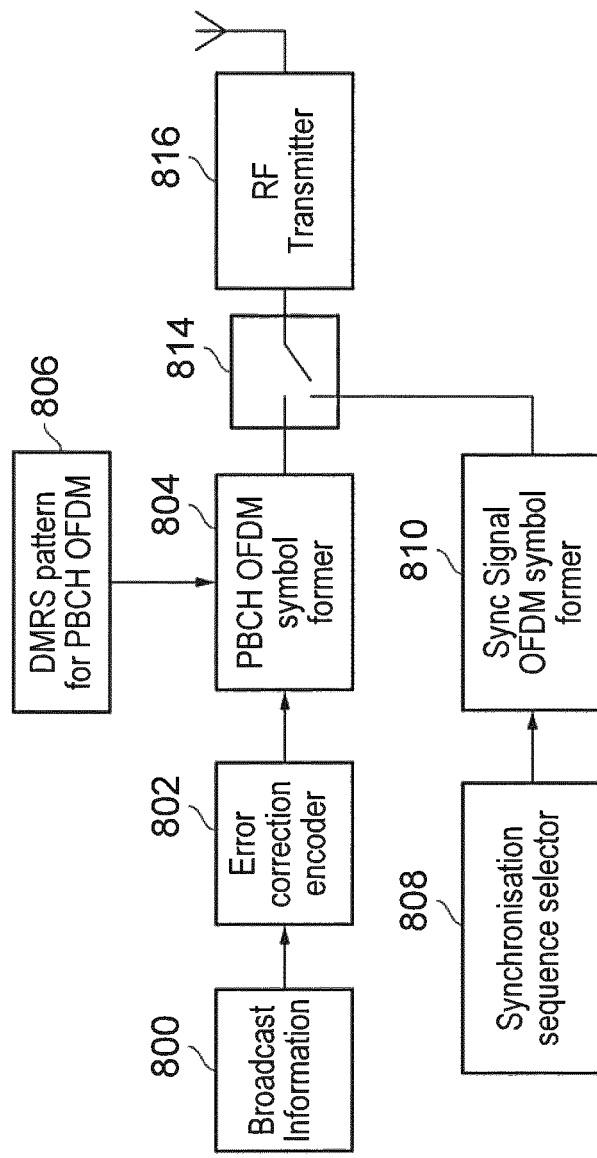
FIG. 7 is a schematic block diagram illustrating an arrangement of a transmitter which may form part of a base station shown in FIG. 1, 2 or 3.

FIG. 7 provides an example of a schematic block diagram of a transmitter which is configured to transmit a synchronisation signal block in accordance with the present technique. As shown in FIG. 7 broadcast system information for transmission to a communications device is generated within a first block 800 and fed to an error correction encoder 802. The error correction encoder 802 performs an error correction encoding process in which redundant information is added to the information representing the broadcast system information in accordance with an error correction scheme (block or convolution encoding). In some examples a cyclic redundancy check (CRC) may be added to confirm the integrity of the information at the receiver. As explained below, in some examples more than one code word maybe used such as for example two code words, one encoding system information for transmission in the overlap region and the other encoding system information for transmitting in the non-overlap region. Since the channel estimate in the overlap region will be better than in the non-overlap region, an amount of redundancy of the error correction code used for the non overlap region maybe increased in order to equalise the transmission integrity across the broadcast system information.

The error correction encoded broadcast system information is then received by a PBCH OFDM symbol former 804. The PBCH OFDM symbol former 804 receives a pattern of demodulation reference symbols to form one of the example OFDM symbols for carrying the broadcast system information as shown in FIG. 5. The pattern of DMRS reference symbols for the PBCH OFDM symbols are fed from the block 806 to the PBCH OFDM symbol former which generates the one or more PBCH OFDM symbols for transmission. In parallel a synchronisation sequence for forming the synchronisation OFDM symbol is generated by a synchronisation sequence selector 808 which is fed to a synchronisation signal OFDM signal former 810. The synchronisation OFDM symbol former 810 loads the selected synchronisation sequence into the synchronisation OFDM symbol to form the synchronisation OFDM symbol for transmission. A multiplexer 814 then receives the synchronisation OFDM symbols sequentially with the one or more PBCH OFDM symbols for transmission from an RF transmitter 816 to provide the temporally separate transmission of the synchronisation OFDM symbol followed by the one or more PBCH OFDM symbols.

Figure 8:
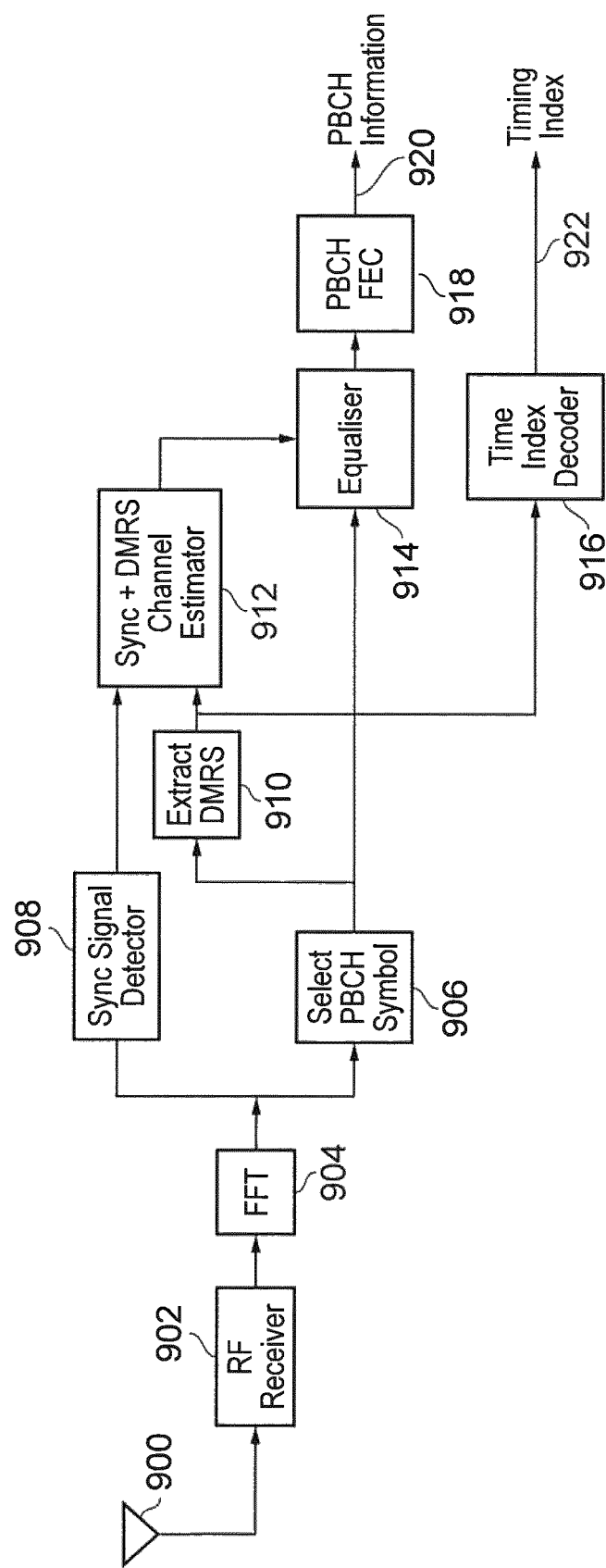
FIG. 8 is a schematic block diagram of a receiver for detecting and recovering information from, for example, a physical broadcast channel in accordance with an embodiment of the present technique, which may form part of a wireless communications device.

FIG. 8 provides a schematic block diagram of a receiver. As shown in FIG. 8, a receive antenna 900 feeds a detected radio frequency signal to a radio frequency receiver 902, which isolates the desired signal, which comprises a synchronisation signal block. This synchronisation signal block then undergoes a fast Fourier transform (FFT) 904, and a synchronisation signal detector 908 then serves to detect sequentially the synchronisation OFDM symbols (PSS and SSS). The synchronisation signal OFDM detector 908 generates an estimate of the synchronisation sequence carried by the synchronisation OFDM symbol and feeds the estimated synchronisation sequence to a channel estimator 912. Meanwhile, PBCH OFDM symbols are detected 906 from the synchronisation signal block following the FFT 904, and these are fed into an equaliser 914. The demodulation reference symbols are recovered 910 from the selected PBCH OFDM symbols, and these are input into the channel estimator along with the estimated synchronisation sequence. The channel estimator 912 then serves to generate an estimate of the channel transfer function in the frequency domain from the recovered demodulation reference symbols by comparing these with replicas known at the receiver having a predetermined amplitude and phase to generate for each demodulation reference symbol a sample of the channel transfer function. The channel estimator 912 then combines the estimate of the channel transfer function for each selected PBCH OFDM symbol with the estimated synchronisation sequence to generate an estimate of the channel transfer function for the PBCH OFDM symbol. The channel transfer function is then fed to the equaliser 914 which removes the effect of the channel from the detected OFDM symbols. An error correction decoder 918 then performs an error correction decoding process on encoded broadcast information carried by the PBCH and provides the broadcast system information on the output 920. Concurrently, a time index decoder 916 is able to decode the received PBCH OFDM symbols in order to recover a synchronisation signal block time index which represents a cardinal number of the received synchronisation signal block. The result of the determination of the cardinal number of the received synchronisation signal block, which is related to a beam of a plurality of beams used by the transmitter to transmit the synchronisation signal block to the receiver of FIG. 8, is also output 922 by the receiver.

In some examples the channel estimator 908 performs time interpolation between the samples of the channel transfer function estimated from the demodulation reference symbols and those estimated from the synchronisation sequence of the synchronisation OFDM symbol.

The following numbered paragraphs provide further example aspects and features of the present technique:

Paragraph 1. A wireless communications device for transmitting or receiving data via a wireless communications network, the wireless communications device comprising transmitter circuitry configured to transmit radio signals via a wireless access interface to an infrastructure equipment forming a radio network part of the wireless communications network, receiver circuitry configured to receive radio signals transmitted from the infrastructure equipment via the wireless access interface, and controller circuitry configured to control the transmitter circuitry and the receiver circuitry to transmit data carried by the radio signals to the infrastructure equipment and to receive data carried by the radio signals from the infrastructure equipment, the controller circuitry being configured with the receiver circuitry to detect a plurality of synchronisation signal blocks transmitted by the infrastructure equipment via the wireless access interface, each synchronisation signal block comprising one or more first Orthogonal Frequency Division Multiplexed, OFDM, symbols carrying a primary synchronisation signal, one or more second OFDM symbols carrying a secondary synchronisation signal and one or more third OFDM symbols carrying information of a physical broadcast channel of the wireless access interface, each of the OFDM symbols of the synchronisation block being formed by a plurality of frequency domain sub-carrier signals each being transmitted over the duration of the OFDM symbol as a resource element of the wireless access interface, each OFDM symbol of the synchronisation signal block having the same sub-carrier spacing, and each of the third OFDM symbols being arranged to include demodulation reference symbols, each synchronisation signal block being transmitted through one beam of a plurality of beams, each beam being formed using a plurality of antennas, and an antenna weight vector used to form each beam is the same for the first OFDM symbols, the second OFDM symbols and the third OFDM symbols, to decode each of the detected synchronisation signal blocks to recover a synchronisation signal block time index representing a cardinal number of the detected synchronisation signal block, each cardinal number being associated with a beam of the plurality of beams used to transmit the detected synchronisation signal blocks, and to determine, based on the recovered synchronisation signal block time index, which of the beams was used to transmit the each of the detected synchronisation signal blocks.

Paragraph 2. A wireless communications device according to Paragraph 1, wherein at least part of the synchronisation signal block time index is indicated by relative positions within the detected synchronisation signal block of the first OFDM symbols, the second OFDM symbols and the third OFDM symbols.

Paragraph 3. A wireless communications device according to Paragraph 2, wherein each of the synchronisation signal blocks have one of a plurality of unique compositions of relative positions within the each of the synchronisation signal blocks of the first OFDM symbols, the second OFDM symbols and the third OFDM symbols.

Paragraph 4. A wireless communications device according to Paragraph 3, wherein a first of the compositions indicates synchronisation signal block time indices representing synchronisation signal blocks with odd cardinal numbers, and a second of the compositions indicates synchronisation signal block time indices representing synchronisation signal blocks with even cardinal numbers.

Paragraph 5. A wireless communications device according to Paragraph 3, wherein a first of the compositions indicates synchronisation signal block time indices representing synchronisation signal blocks with a cardinal number forming part of a first predetermined range, and a second of the compositions indicates synchronisation signal block time indices representing synchronisation signal blocks with a cardinal number forming part of a second predetermined range, the first predetermined range being distinct from the second predetermined range.

Paragraph 6. A wireless communications device according to Paragraph 5, wherein a most significant bit of the synchronisation signal block time indices representing the synchronisation signal blocks with a cardinal number forming part of the first predetermined range is different to a most significant bit of the synchronisation signal block time indices representing the synchronisation signal blocks with a cardinal number forming part of the second predetermined range.

Paragraph 7. A wireless communications device according to any Paragraphs 1 to 6, configured to demodulate the demodulation reference symbols using a sequence derived from the recovered synchronisation signal block time index.

Paragraph 8. A wireless communications device according to any of Paragraphs 1 to 7, configured to demodulate payload data carried by the physical broadcast channel, the payload data having been modulated using signal space diversity by the infrastructure equipment.

Paragraph 9. A method of operating a wireless communications device for transmitting or receiving data via a wireless communications network, the method comprising detecting a plurality of synchronisation signal blocks transmitted by an infrastructure equipment forming part of a radio network part of the wireless communications network via a wireless access interface, each synchronisation signal block comprising one or more first Orthogonal Frequency Division Multiplexed, OFDM, symbols carrying a primary synchronisation signal, one or more second OFDM symbols carrying a secondary synchronisation signal and one or more third OFDM symbols carrying information of a physical broadcast channel of the wireless access interface, each of the OFDM symbols of the synchronisation block being formed by a plurality of frequency domain subcarrier signals each being transmitted over the duration of the OFDM symbol as a resource element of the wireless access interface, each OFDM symbol of the synchronisation signal block having the same subcarrier spacing, and each of the third OFDM symbols being arranged to include demodulation reference symbols, each synchronisation signal block being transmitted through one beam of a plurality of beams, each beam being formed using a plurality of antennas, and an antenna weight vector used to form each beam is the same for the first OFDM symbols, the second OFDM symbols and the third OFDM symbols, decoding each of the detected synchronisation signal blocks to recover a synchronisation signal block time index representing a cardinal number of the detected synchronisation signal block, each cardinal number being associated with a beam of the plurality of beams used to transmit the detected synchronisation signal blocks, and determining, based on the recovered synchronisation signal block time index, which of the beams was used to transmit the each of the detected synchronisation signal blocks.

Paragraph 10. A method according to Paragraph 9, wherein at least part of the synchronisation signal block time index is indicated by relative positions within the detected synchronisation signal block of the first OFDM symbols, the second OFDM symbols and the third OFDM symbols.

Paragraph 11. A method according to Paragraph 10, wherein each of the synchronisation signal blocks have one of a plurality of unique compositions of relative positions within the each of the synchronisation signal blocks of the first OFDM symbols, the second OFDM symbols and the third OFDM symbols.

Paragraph 12. A method according to any of Paragraphs 9 to 11, comprising demodulating the demodulation reference symbols using a sequence derived from the recovered synchronisation signal block time index.

Paragraph 13. A method according to any of Paragraphs 9 to 12, comprising demodulating payload data carried by the physical broadcast channel, the payload data having been modulated using signal space diversity by the infrastructure equipment.

Paragraph 14. An infrastructure equipment for forming part of a radio network part of a wireless communications network, the infrastructure equipment comprising transmitter circuitry configured to transmit radio signals via a wireless access interface formed by the infrastructure equipment to one or more wireless communications devices, receiver circuitry configured to receive radio signals transmitted from the one or more wireless communications devices via the wireless access interface, and controller circuitry configured to control the transmitter circuitry and the receiver circuitry to transmit data carried by the radio signals to the one or more wireless communications devices and to receive data carried by the radio signals from the one or more wireless communications devices, the controller circuitry being configured with the receiver circuitry to form a plurality of synchronisation signal blocks each comprising one or more first Orthogonal Frequency Division Multiplexed, OFDM, symbols carrying a primary synchronisation signal, one or more second OFDM symbols carrying a secondary synchronisation signal and one or more third OFDM symbols carrying information of a physical broadcast channel of the wireless access interface, each of the OFDM symbols of the synchronisation block being formed by a plurality of frequency domain sub-carrier signals each being transmitted over the duration of the OFDM symbol as a resource element of the wireless access interface, each OFDM symbol of the synchronisation signal block having the same sub-carrier spacing, and each of the third OFDM symbols being arranged to include demodulation reference symbols, each synchronisation signal block being transmitted through one beam of a plurality of beams, each beam being formed using a plurality of antennas, and an antenna weight vector used to form each beam is the same for the first OFDM symbols, the second OFDM symbols and the third OFDM symbol, and to transmit the synchronisation signal blocks to the one or more wireless communications devices for receiving the broadcast information provided by the physical broadcast channel, wherein each of the synchronisation signal blocks comprise an indication of a synchronisation signal block time index representing a cardinal number of the each of the synchronisation signal blocks, each cardinal number being associated with a beam of the plurality of beams used to transmit the each of the synchronisation signal blocks.

Paragraph 15. An infrastructure equipment according to Paragraph 14, wherein at least part of the synchronisation signal block time index is indicated by relative positions within the detected synchronisation signal block of the first OFDM symbols, the second OFDM symbols and the third OFDM symbols.

Paragraph 16. An infrastructure equipment according to Paragraph 15, wherein each of the synchronisation signal blocks have one of a plurality of unique compositions of relative positions within the each of the synchronisation signal blocks of the first OFDM symbols, the second OFDM symbols and the third OFDM symbols.

Paragraph 17. An infrastructure equipment according to Paragraph 16, wherein a first of the compositions indicates synchronisation signal block time indices representing synchronisation signal blocks with odd cardinal numbers, and a second of the compositions indicates synchronisation signal block time indices representing synchronisation signal blocks with even cardinal numbers.

Paragraph 18. An infrastructure equipment according to Paragraph 16, wherein a first of the compositions indicates synchronisation signal block time indices representing synchronisation signal blocks with a cardinal number forming part of a first predetermined range, and a second of the compositions indicates synchronisation signal block time indices representing synchronisation signal blocks with a cardinal number forming part of a second predetermined range, the first predetermined range being distinct from the second predetermined range.

Paragraph 19. An infrastructure equipment according to Paragraph 18, wherein a most significant bit of the synchronisation signal block time indices representing the synchronisation signal blocks with a cardinal number forming part of the first predetermined range is different to a most significant bit of the synchronisation signal block time indices representing the synchronisation signal blocks with a cardinal number forming part of the second predetermined range.

Paragraph 20. An infrastructure equipment according to any of Paragraphs 14 to 19, configured to modulate payload data carried by the physical broadcast channel using signal space diversity.

Paragraph 21. A method of operating an infrastructure equipment for forming part of a radio network part of a wireless communications network, the method comprising forming a plurality of synchronisation signal blocks each comprising one or more first Orthogonal Frequency Division Multiplexed, OFDM, symbols carrying a primary synchronisation signal, one or more second OFDM symbols carrying a secondary synchronisation signal and one or more third OFDM symbols carrying information of a physical broadcast channel of a wireless access interface formed by the infrastructure equipment, each of the OFDM symbols of the synchronisation block being formed by a plurality of frequency domain sub-carrier signals each being transmitted over the duration of the OFDM symbol as a resource element of the wireless access interface, each OFDM symbol of the synchronisation signal block having the same sub-carrier spacing, and each of the third OFDM symbols being arranged to include demodulation reference symbols, each synchronisation signal block being transmitted through one beam of a plurality of beams, each beam being formed using a plurality of antennas, and an antenna weight vector used to form each beam is the same for the first OFDM symbols, the second OFDM symbols and the third OFDM symbols, and transmitting the synchronisation signal blocks to one or more wireless communications devices for receiving the broadcast information provided by the physical broadcast channel, wherein each of the synchronisation signal blocks comprise an indication of a synchronisation signal block time index representing a cardinal number of the each of the synchronisation signal blocks, each cardinal number being associated with a beam of the plurality of beams used to transmit the each of the synchronisation signal blocks.

Paragraph 22. A method according to Paragraph 21, wherein at least part of the synchronisation signal block time index is indicated by relative positions within the detected synchronisation signal block of the first OFDM symbols, the second OFDM symbols and the third OFDM symbols.

Paragraph 23. A method according to Paragraph 22, wherein each of the synchronisation signal blocks have one of a plurality of unique compositions of relative positions within the each of the synchronisation signal blocks of the first OFDM symbols, the second OFDM symbols and the third OFDM symbols.

Paragraph 24. A method according to any of Paragraphs 21 to 23, comprising modulating payload data carried by the physical broadcast channel using signal space diversity.

Paragraph 25. Circuitry for a wireless communications device for transmitting or receiving data via a wireless communications network, the wireless communications device comprising transmitter circuitry configured to transmit radio signals via a wireless access interface to an infrastructure equipment forming a radio network part of the wireless communications network, receiver circuitry configured to receive radio signals transmitted from the infrastructure equipment via the wireless access interface, and controller circuitry configured to control the transmitter circuitry and the receiver circuitry to transmit data carried by the radio signals to the infrastructure equipment and to receive data carried by the radio signals from the infrastructure equipment, the controller circuitry being configured with the receiver circuitry to detect a plurality of synchronisation signal blocks transmitted by the infrastructure equipment via the wireless access interface, each synchronisation signal block comprising one or more first Orthogonal Frequency Division Multiplexed, OFDM, symbols carrying a primary synchronisation signal, one or more second OFDM symbols carrying a secondary synchronisation signal and one or more third OFDM symbols carrying information of a physical broadcast channel of the wireless access interface, each of the OFDM symbols of the synchronisation block being formed by a plurality of frequency domain sub-carrier signals each being transmitted over the duration of the OFDM symbol as a resource element of the wireless access interface, each OFDM symbol of the synchronisation signal block having the same sub-carrier spacing, and each of the third OFDM symbols being arranged to include demodulation reference symbols, each synchronisation signal block being transmitted through one beam of a plurality of beams, each beam being formed using a plurality of antennas, and an antenna weight vector used to form each beam is the same for the first OFDM symbols, the second OFDM symbols and the third OFDM symbols, to decode each of the detected synchronisation signal blocks to recover a synchronisation signal block time index representing a cardinal number of the detected synchronisation signal block, each cardinal number being associated with a beam of the plurality of beams used to transmit the detected synchronisation signal blocks, and to determine, based on the recovered synchronisation signal block time index, which of the beams was used to transmit the each of the detected synchronisation signal blocks.

Paragraph 26. Circuitry for an infrastructure equipment for forming part of a radio network part of a wireless communications network, the infrastructure equipment comprising transmitter circuitry configured to transmit radio signals via a wireless access interface formed by the infrastructure equipment to one or more wireless communications devices, receiver circuitry configured to receive radio signals transmitted from the one or more wireless communications devices via the wireless access interface, and controller circuitry configured to control the transmitter circuitry and the receiver circuitry to transmit data carried by the radio signals to the one or more wireless communications devices and to receive data carried by the radio signals from the one or more wireless communications devices, the controller circuitry being configured with the receiver circuitry to form a plurality of synchronisation signal blocks each comprising one or more first Orthogonal Frequency Division Multiplexed, OFDM, symbols carrying a primary synchronisation signal, one or more second OFDM symbols carrying a secondary synchronisation signal and one or more third OFDM symbols carrying information of a physical broadcast channel of the wireless access interface, each of the OFDM symbols of the synchronisation block being formed by a plurality of frequency domain sub-carrier signals each being transmitted over the duration of the OFDM symbol as a resource element of the wireless access interface, each OFDM symbol of the synchronisation signal block having the same sub-carrier spacing, and each of the third OFDM symbols being arranged to include demodulation reference symbols, each synchronisation signal block being transmitted through one beam of a plurality of beams, each beam being formed using a plurality of antennas, and an antenna weight vector used to form each beam is the same for the first OFDM symbols, the second OFDM symbols and the third OFDM symbols, and to transmit the synchronisation signal blocks to the one or more wireless communications devices for receiving the broadcast information provided by the physical broadcast channel, wherein each of the synchronisation signal blocks comprise an indication of a synchronisation signal block time index representing a cardinal number of the each of the synchronisation signal blocks, each cardinal number being associated with a beam of the plurality of beams used to transmit the each of the synchronisation signal blocks.

Paragraph 27. A wireless communications device for transmitting or receiving data via a wireless communications network, the wireless communications device comprising transmitter circuitry configured to transmit radio signals via a wireless access interface to an infrastructure equipment forming a radio network part of the wireless communications network, receiver circuitry configured to receive radio signals transmitted from the infrastructure equipment via the wireless access interface, and controller circuitry configured to control the transmitter circuitry and the receiver circuitry to transmit data carried by the radio signals to the infrastructure equipment and to receive data carried by the radio signals from the infrastructure equipment, the controller circuitry being configured with the receiver circuitry to detect a plurality of synchronisation signal blocks transmitted by the infrastructure equipment via the wireless access interface, each synchronisation signal block comprising one or more first Orthogonal Frequency Division Multiplexed, OFDM, symbols carrying a primary synchronisation signal, one or more second OFDM symbols carrying a secondary synchronisation signal and one or more third OFDM symbols carrying information of a physical broadcast channel of the wireless access interface, each of the OFDM symbols of the synchronisation block being formed by a plurality of frequency domain sub-carrier signals each being transmitted over the duration of the OFDM symbol as a resource element of the wireless access interface, each OFDM symbol of the synchronisation signal block having the same sub-carrier spacing, and each of the third OFDM symbols being arranged to include demodulation reference symbols, each synchronisation signal block being transmitted through one beam of a plurality of beams, each beam being formed using a plurality of antennas, and an antenna weight vector used to form each beam is the same for the first OFDM symbols, the second OFDM symbols and the third OFDM symbols, to decode each of the detected synchronisation signal blocks to recover a synchronisation signal block time index representing a cardinal number of the detected synchronisation signal block, each cardinal number being associated with a beam of the plurality of beams used to transmit the detected synchronisation signal blocks, to determine, based on the recovered synchronisation signal block time index, which of the beams was used to transmit the each of the detected synchronisation signal blocks, and to demodulate payload data carried by the physical broadcast channel, the payload data having been modulated using signal space diversity by the infrastructure equipment.

Paragraph 28. An infrastructure equipment for forming part of a radio network part of a wireless communications network, the infrastructure equipment comprising transmitter circuitry configured to transmit radio signals via a wireless access interface formed by the infrastructure equipment to one or more wireless communications devices, receiver circuitry configured to receive radio signals transmitted from the one or more wireless communications devices via the wireless access interface, and controller circuitry configured to control the transmitter circuitry and the receiver circuitry to transmit data carried by the radio signals to the one or more wireless communications devices and to receive data carried by the radio signals from the one or more wireless communications devices, the controller circuitry being configured with the receiver circuitry to form a plurality of synchronisation signal blocks each comprising one or more first Orthogonal Frequency Division Multiplexed, OFDM, symbols carrying a primary synchronisation signal, one or more second OFDM symbols carrying a secondary synchronisation signal and one or more third OFDM symbols carrying information of a physical broadcast channel of the wireless access interface, each of the OFDM symbols of the synchronisation block being formed by a plurality of frequency domain sub-carrier signals each being transmitted over the duration of the OFDM symbol as a resource element of the wireless access interface, each OFDM symbol of the synchronisation signal block having the same sub-carrier spacing, and each of the third OFDM symbols being arranged to include demodulation reference symbols, each synchronisation signal block being transmitted through one beam of a plurality of beams, each beam being formed using a plurality of antennas, and an antenna weight vector used to form each beam is the same for the first OFDM symbols, the second OFDM symbols and the third OFDM symbols, to transmit the synchronisation signal blocks to the one or more wireless communications devices for receiving the broadcast information provided by the physical broadcast channel, and to modulate payload data carried by the physical broadcast channel using signal space diversity, wherein each of the synchronisation signal blocks comprise an indication of a synchronisation signal block time index representing a cardinal number of the each of the synchronisation signal blocks, each cardinal number being associated with a beam of the plurality of beams used to transmit the each of the synchronisation signal blocks.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] LTE for UMTS: OFDMA and SC-FDMA Based Radio Access, Harris Holma and Antti Toskala, Wiley 2009, ISBN 978-0-470-99401-6.
[2] RP-151621, "New Work Item: NarrowBand IOT NB-IOT," Qualcomm, RAN #69.
[3] RP-170847, "New WID on New Radio Access Technology," NTT DOCOMO, RAN #75.
[4] European patent applicant no. EP17169834.3, May 2017.
[5] "Signal Space Diversity: a power and bandwidth efficient diversity technique for the Rayleigh fading channel" by J. Boutros and E. Viterbo, IEEE Transactions on Information Theory, vol. 44, n. 4, pp. 1453-1467, July 1998
[6] S. Atungsiri, M. Beale, "Signal space diversity with rotation angle dependent modulation used," WO 2016/075475 A1, May 2016.

What is claimed is:

1. A wireless communications device for transmitting or receiving data via a wireless communications network, the wireless communications device comprising:

transmitter circuitry configured to transmit radio signals via a wireless access interface to an infrastructure equipment forming a radio network part of the wireless communications network, receiver circuitry configured to receive radio signals transmitted from the infrastructure equipment via the wireless access interface, and controller circuitry configured to control the transmitter circuitry and the receiver circuitry to transmit data carried by the radio signals to the infrastructure equipment and to receive data carried by the radio signals from the infrastructure equipment, the controller circuitry being configured with the receiver circuitry to detect a plurality of synchronisation signal blocks transmitted by the infrastructure equipment via the wireless access interface, each synchronisation signal block comprising one or more first Orthogonal Frequency Division Multiplexed, OFDM, symbols carrying a primary synchronisation signal, one or more second OFDM symbols carrying a secondary synchronisation signal and one or more third OFDM symbols carrying information of a physical broadcast channel of the wireless access interface, each of the OFDM symbols of the synchronisation block being formed by a plurality of frequency domain sub-carrier signals each being transmitted over the duration of the OFDM symbol as a resource element of the wireless access interface, each OFDM symbol of the synchronisation signal block having the same sub-carrier spacing, and each of the third OFDM symbols being arranged to include demodulation reference symbols, each synchronisation signal block being transmitted through one beam of a plurality of beams, each beam being formed using a plurality of antennas, and an antenna weight vector used to form each beam is the same for the first OFDM symbols, the second OFDM symbols and the third OFDM symbols, to decode each of the detected synchronisation signal blocks to recover a synchronisation signal block time index representing a cardinal number of the detected synchronisation signal block, each cardinal number being associated with a beam of the plurality of beams used to transmit the detected synchronisation signal blocks, and to determine, based on the recovered synchronisation signal block time index, which of the beams was used to transmit the each of the detected synchronisation signal blocks, wherein at least part of the synchronisation signal block time index is indicated by relative positions within the detected synchronisation signal block of the first OFDM symbols, the second OFDM symbols and the third OFDM symbols, wherein each of the synchronisation signal blocks have one of a plurality of unique compositions of relative positions within the each of the synchronisation signal blocks of the first OFDM symbols, the second OFDM symbols and the third OFDM symbols, wherein a first of the compositions indicates synchronisation signal block time indices representing synchronisation signal blocks with a cardinal number forming part of a first predetermined range, and a second of the compositions indicates synchronisation signal block time indices representing synchronisation signal blocks with a cardinal number forming part of a second predetermined range, the first predetermined range being distinct from the second predetermined range, wherein a most significant bit of the synchronisation signal block time indices representing the synchronisation signal blocks with a cardinal number forming part of the first predetermined range is different to a most significant bit of the synchronisation signal block time indices representing the synchronisation signal blocks with a cardinal number forming part of the second predetermined range.

2. The wireless communications device according to claim 1, configured to demodulate the demodulation reference symbols using a sequence derived from the recovered synchronisation signal block time index.

3. The wireless communications device according to claim 1, configured to demodulate payload data carried by the physical broadcast channel, the payload data having been modulated using signal space diversity by the infrastructure equipment.

4. A method of operating a wireless communications device for transmitting or receiving data via a wireless communications network, the method comprising:

detecting a plurality of synchronisation signal blocks transmitted by an infrastructure equipment forming part of a radio network part of the wireless communications network via a wireless access interface, each synchronisation signal block comprising one or more first Orthogonal Frequency Division Multiplexed, OFDM, symbols carrying a primary synchronisation signal, one or more second OFDM symbols carrying a secondary synchronisation signal and one or more third OFDM symbols carrying information of a physical broadcast channel of the wireless access interface, each of the OFDM symbols of the synchronisation block being formed by a plurality of frequency domain sub-carrier signals each being transmitted over the duration of the OFDM symbol as a resource element of the wireless access interface, each OFDM symbol of the synchronisation signal block having the same sub-carrier spacing, and each of the third OFDM symbols being arranged to include demodulation reference symbols, each synchronisation signal block being transmitted through one beam of a plurality of beams, each beam being formed using a plurality of antennas, and an antenna weight vector used to form each beam is the same for the first OFDM symbols, the second OFDM symbols and the third OFDM symbols, decoding each of the detected synchronisation signal blocks to recover a synchronisation signal block time index representing a cardinal number of the detected synchronisation signal block, each cardinal number being associated with a beam of the plurality of beams used to transmit the detected synchronisation signal blocks, and determining, based on the recovered synchronisation signal block time index, which of the beams was used to transmit the each of the detected synchronisation signal blocks, wherein at least part of the synchronisation signal block time index is indicated by relative positions within the detected synchronisation signal block of the first OFDM symbols, the second OFDM symbols and the third OFDM symbols, wherein each of the synchronisation signal blocks have one of a plurality of unique compositions of relative positions within the each of the synchronisation signal blocks of the first OFDM symbols, the second OFDM symbols and the third OFDM symbols, wherein a first of the compositions indicates synchronisation signal block time indices representing synchronisation signal blocks with a cardinal number forming part of a first predetermined range, and a second of the compositions indicates synchronisation signal block time indices representing synchronisation signal blocks with a cardinal number forming part of a second predetermined range, the first predetermined range being distinct from the second predetermined range, wherein a most significant bit of the synchronisation signal block time indices representing the synchronisation signal blocks with a cardinal number forming part of the first predetermined range is different to a most significant bit of the synchronisation signal block time indices representing the synchronisation signal blocks with a cardinal number forming part of the second predetermined range.

5. The method according to claim 4, comprising
demodulating the demodulation reference symbols using a sequence derived from the recovered synchronisation signal block time index.

6. The method according to claim 4, comprising
demodulating payload data carried by the physical broadcast channel, the payload data having been modulated using signal space diversity by the infrastructure equipment.

7. An infrastructure equipment for forming part of a radio network part of a wireless communications network, the infrastructure equipment comprising:

transmitter circuitry configured to transmit radio signals via a wireless access interface formed by the infrastructure equipment to one or more wireless communications devices, receiver circuitry configured to receive radio signals transmitted from the one or more wireless communications devices via the wireless access interface, and controller circuitry configured to control the transmitter circuitry and the receiver circuitry to transmit data carried by the radio signals to the one or more wireless communications devices and to receive data carried by the radio signals from the one or more wireless communications devices, the controller circuitry being configured with the transmitter circuitry to form a plurality of synchronisation signal blocks each comprising one or more first Orthogonal Frequency Division Multiplexed, OFDM, symbols carrying a primary synchronisation signal, one or more second OFDM symbols carrying a secondary synchronisation signal and one or more third OFDM symbols carrying information of a physical broadcast channel of the wireless access interface, each of the OFDM symbols of the synchronisation block being formed by a plurality of frequency domain sub-carrier signals each being transmitted over the duration of the OFDM symbol as a resource element of the wireless access interface, each OFDM symbol of the synchronisation signal block having the same sub-carrier spacing, and each of the third OFDM symbols being arranged to include demodulation reference symbols, each synchronisation signal block being transmitted through one beam of a plurality of beams, each beam being formed using a plurality of antennas, and an antenna weight vector used to form each beam is the same for the first OFDM symbols, the second OFDM symbols and the third OFDM symbol, and to transmit the synchronisation signal blocks to the one or more wireless communications devices for receiving the broadcast information provided by the physical broadcast channel, wherein each of the synchronisation signal blocks comprise an indication of a synchronisation signal block time index representing a cardinal number of the each of the synchronisation signal blocks, each cardinal number being associated with a beam of the plurality of beams used to transmit the each of the synchronisation signal blocks, wherein at least part of the synchronisation signal block time index is indicated by relative positions the detected synchronisation signal block of the first OFDM symbols, the second OFDM symbols and the third OFDM symbols, wherein each of the synchronisation signal blocks have one of a plurality of unique compositions of relative positions within the each of the synchronisation signal blocks of the first OFDM symbols, the second OFDM symbols and the third OFDM symbols, wherein a first of the compositions indicates synchronisation signal block time indices representing synchronisation signal blocks with a cardinal number firming part of a first predetermined range, and a second of the compositions indicates synchronisation signal block time indices representing synchronisation signal blocks with a cardinal number forming part of a second predetermined range, the first predetermined range being distinct from the second predetermined range, wherein a most significant bit of the synchronisation signal block time indices representing the synchronisation signal blocks with a cardinal number forming part of the first predetermined range is different to a most significant bit of the synchronisation signal block time indices representing the synchronisation signal blocks with a cardinal number forming part of the second predetermined range.

8. The infrastructure equipment according to claim 7, configured to modulate payload data carried by the physical broadcast channel using signal space diversity.

* * * * *